March 30, 1926.
S. H. KATZ
1,578,666
METHOD AND APPARATUS FOR QUANTITATIVE DETERMINATION OF GASES
Filed March 12, 1925  2 Sheets-Sheet 1
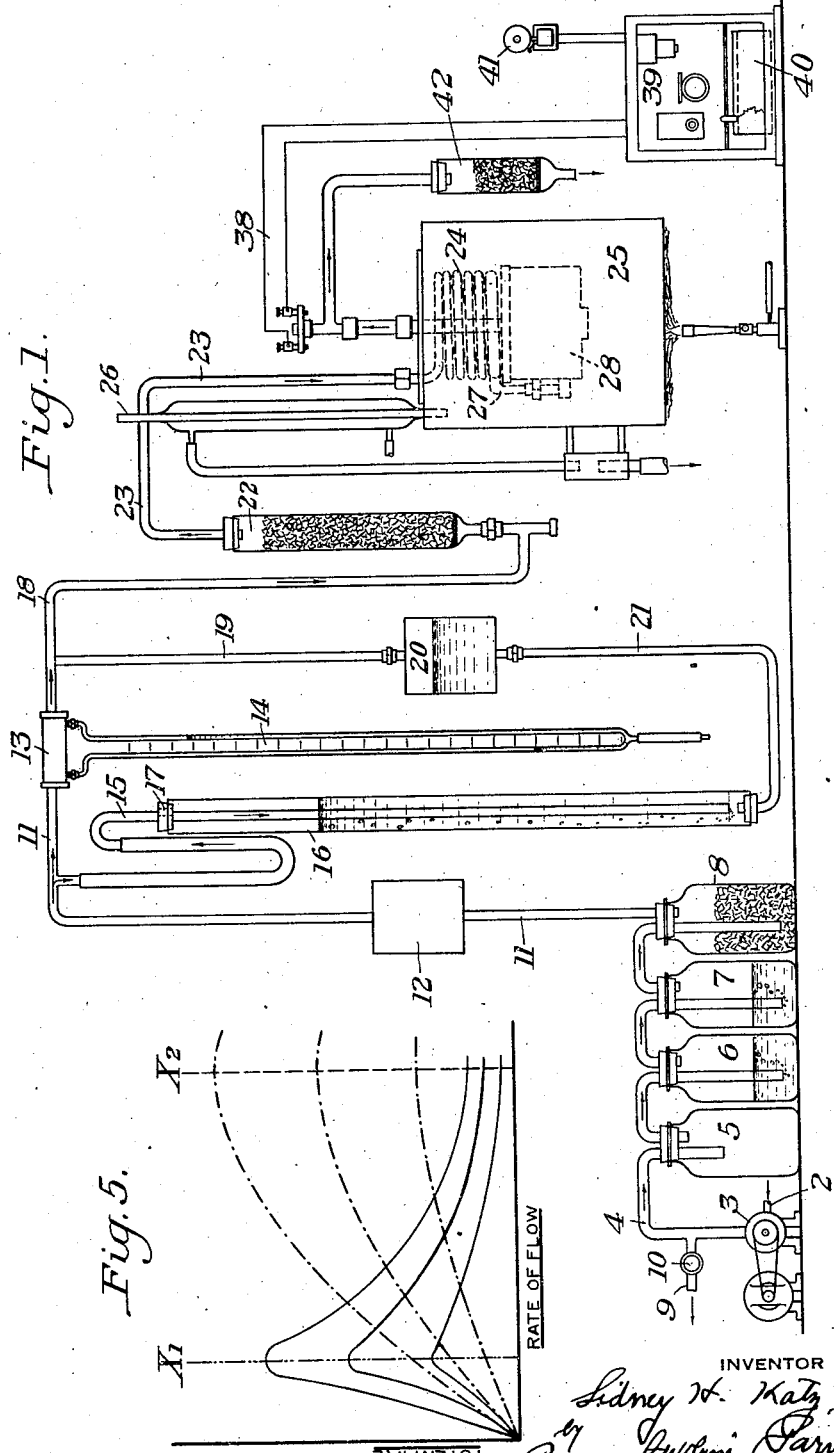
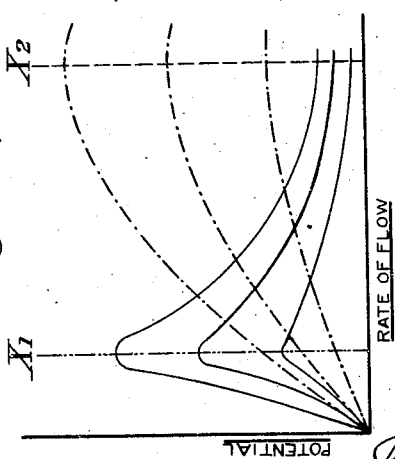
INVENTOR March 30, 1926.  1,578,666
S. H. KATZ
METHOD AND APPARATUS FOR QUANTITATIVE DETERMINATION OF GASES
Filed March 12, 1925    2 Sheets-Sheet 2
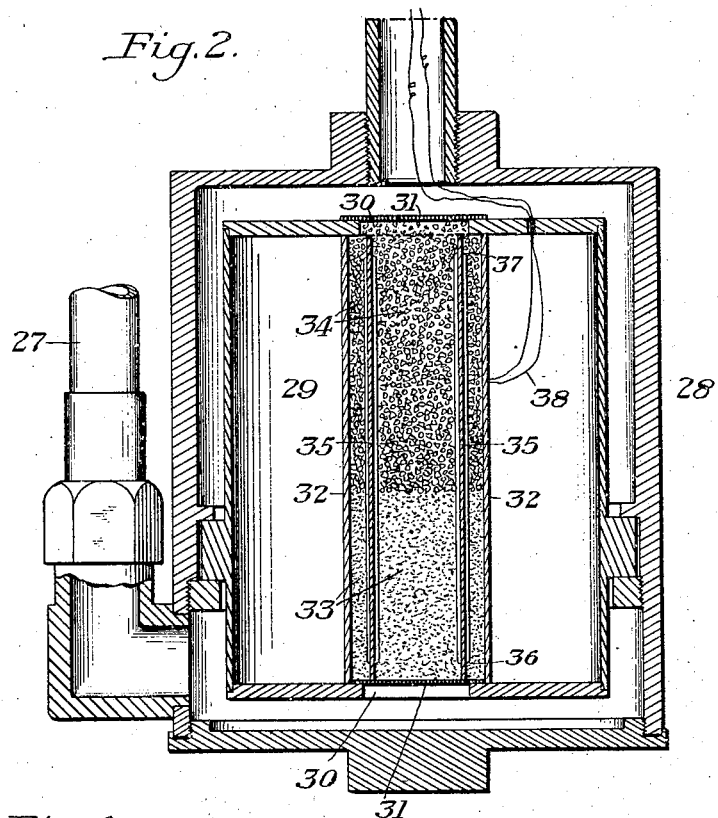
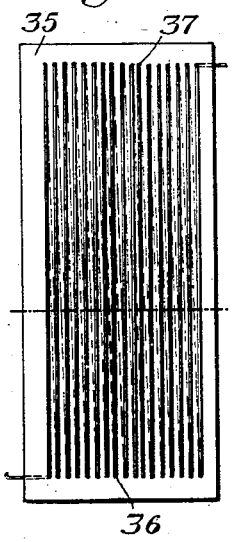
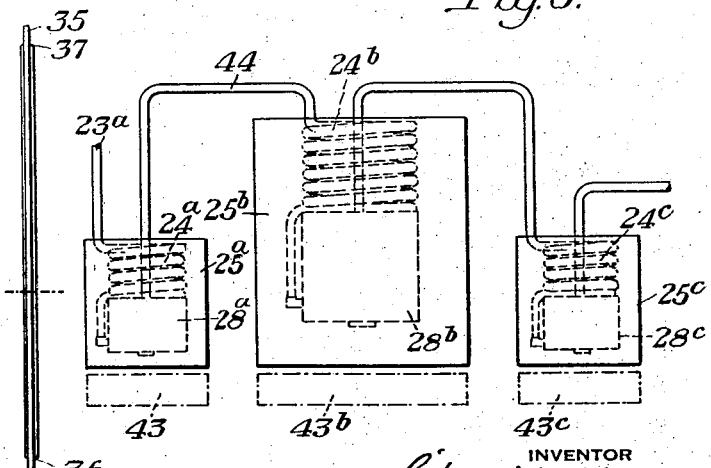
INVENTOR Patented Mar. 30, 1926.

1,578,666

UNITED STATES PATENT OFFICE.

SIDNEY H. KATZ, OF PITTSBURGH, PENNSYLVANIA.

METHOD AND APPARATUS FOR QUANTITATIVE DETERMINATION OF GASES.

Application filed March 12, 1925. Serial No. 14,915.

*To all whom it may concern:*

Be it known that I, SIDNEY H. KATZ, a citizen of the United States, residing at Pittsburgh, county of Allegheny, State of Pennsylvania, have invented a new and useful Improvement in the Method and Apparatus for Quantitative Determination of Gases, of which the following is a full, clear, and exact description.

This invention relates to a method and apparatus for the quantitative determination of combustible gases and is particularly useful for determining the quantity of carbon monoxide or hydrogen present in air or oxygen, although it can also be used for the quantitative determination of other gases.

The principle of indicating the presence of combustible gases in mixture with air or oxygen by a differential temperature effect obtained when the mixture is brought into contact with a catalyst to promote oxidation is well-known and has been used for many years. As heretofore employed, however, the apparatus has not been as sensitive as desired and the use of such apparatus has therefore been limited. A difficulty has also been experienced with the poisoning of the catalyst, thus further materially reducing the accuracy of the apparatus and requiring frequent changes of the catalyst.

I provide for purifying the mixture by removing all gases which may poison the catalyst and thus insure accuracy at all times. Only carbon monoxide, hydrogen, methane and the normal components of air, excepting water vapor, can pass through the purifying system. The carbon monoxide, hydrogen and methane are combustible but the methane is not affected at the temperatures employed and passes through the apparatus without change.

If hydrogen accompanies the carbon monoxide the temperature of the environment of the catalyst is important. According to the proportion of hydrogen the temperature is maintained at a higher or lower point to cause most active oxidation of carbon monoxide compatible with reduction of oxidation of hydrogen to a negligible amount.

I further provide a greatly improved method of measuring the temperature increase when the mixture is exposed to the catalyst, and am thus enabled to measure exceedingly minute quantities of such gases as carbon monoxide in air. The apparatus is therefore exceedingly useful in the determination of CO content in tunnel gases and the like.

I also provide for operating the apparatus at the best flow rate for measuring the gas concentration. Experiments show that if the temperature increase is measured by a thermocouple system and the flow rate be plotted against the potential for any concentration, the potential rises quite sharply with the rate of flow until a maximum is reached, after which the potential falls off rather more slowly. Tests with gases of various concentrations show that these maxima occur at substantially the same rate of flow, and that the rapidity of response of the apparatus to varying concentration is more rapid at this flow. I therefore provide for supplying gas to the measuring apparatus at this flow rate, thus securing the maximum potential for any concentration of gas. This is conducive toward greatly increased accuracy in measuring the concentration of CO or other gas being measured.

I provide a plurality of thermocouples arranged in series for measuring the temperature increase occasioned by passing the gas mixture over the catalyst. This arrangement greatly increases the potential and is conducive to highly accurate readings. The combination of these several features provides an apparatus which in practice has been found capable of measuring extremely low percentages of carbon monoxide. The device has been successfully used to measure concentrations up to ½% of CO and it is therefore useful in commercial applications such as measuring the CO content of stack gases from boiler furnaces or other combustion furnaces. When it is to be used for the quantitative determination of gases which are very rich in carbon monoxide or other gas to be measured, as for example blast furnace gas, the apparatus may be used by diluting the gas to be measured with a known proportion of air. The apparatus when operated at the best rate of flow for carbon monoxide and with the temperature of the catalyst at about 100° C., is not materially affected by hydrogen in partial volume equal to or less than the carbon monoxide because the hydrogen is so much more slowly affected by the catalyst.

Thus hydrogen in the proportions usually present in automobile exhaust gases or flue gases from furnaces, causes a negligible error in the indications of the CO. On the other hand by reducing the rate of flow through the catalyst to about one-fifth of the best rate for carbon monoxide, the best rate for hydrogen is obtained. The effect of the hydrogen in the potentials is increased many fold and the apparatus may, in absence of carbon monoxide or removal of carbon monoxide by selective oxidation be used to indicate hydrogen. Reducing the temperature of the gases brought to the catalyst and the environment of the catalytic cell to 25° C., eliminates entirely any thermoelectric effect due to hydrogen but does not materially reduce the effect of carbon monoxide. Hence by operating in a low temperature environment carbon monoxide can be determined in mixture with any large amounts of hydrogen. Both CO and hydrogen may be determined in a single gas by first determining the CO in a cell at low temperature, then after complete selective oxidation of the CO to $CO_2$ passing the gas through a cell at higher temperature to determine the hydrogen.

In the accompanying drawings illustrating the present preferred embodiment of my invention:

Figure 1 is a diagrammatic view of an apparatus embodying my invention;

Figure 2 is a vertical section through a portion of the apparatus of Figure 1 showing the chamber containing the thermocouples and the catalyst;

Figures 3 and 4 are side and end views respectively of the thermocouples employed;

Figure 5 is a diagram showing the relation between potential and rate of flow for various gas concentrations; and Figure 6 is a diagrammatic view of a modified apparatus.

In the illustrated embodiment of the invention there is shown a supply line 2 through which the gas mixture to be tested is drawn by a motor operated pump 3. The gas passes from the pump 3 through a conduit 4 into a series of bottles 5, 6, 7 and 8. A discharge pipe 9 provided with a valve 10 is connected in the conduit 4 so that excess gas drawn by the pump or blower may be discharged from the apparatus. The bottles 6 and 7 are wash bottles containing sulphuric acid. The acid dries the gases and also removes ammonia and certain hydrocarbons and gases soluble in or retained by sulphuric acid. The bottles 5 and 8 serve as traps to prevent passage of acid to other parts of the apparatus.

From the bottle 8 the washed and dried gas passes through a conduit 11 in which is interposed a receptacle 12 containing a granular mixture of activated charcoal and a caustic substance and filters of absorbent cotton. Air, carbon monoxide and hydrogen and possibly methane will pass through this receptacle but other gases or suspensoids which may affect the catalyst are retained therein.

The purified gas then passes through an orifice type flow meter 13 provided with a calibrated manometer 14 for indicating the rate of flow. Connected to the conduit 11 just ahead of the flow meter 13 is a tube 15 extending downwardly into a well 16. The well 16 is open to the atmosphere at 17 and the arrangement provides an escape for gas from the conduit 11 as long as the pressure inside the conduit exceeds the hydrostatic pressure at the bottom of the tube 15. The flow of gas may be regulated by adjusting the depth to which the tube 15 is immersed in the well 16.

The gas passes from the flow meter 13 through a conduit 18 and connected to this conduit 18 is a pipe 19 communicating with a water reservoir 20. The reservoir 20 is connected to the bottom of the well 16 by a conduit 21 and the apparatus is effective for maintaining a constant rate of flow of gas regardless of the resistance of the succeeding parts of the apparatus. This is accomplished by varying automatically and equivalently the depth of the water in the well 16 as the pressure in the apparatus varies due to any variation in resistance beyond the flow meter 13. A constant pressure difference is thus maintained across the orifice in the flow meter.

The gas passes through the conduit 18 into a receptacle 22 containing broken fused calcium chloride for removing any water vapor which may be still present in the gas, or which may have been entrained as the gas passed through the apparatus. From the receptacle 22 the gas passes through a conduit 23 to a coil 24 contained in a thermostat 25. This thermostat may be of any desired type, but is shown as a bath of saturated steam at atmospheric pressure, the water being heated by a Bunsen burner. The bath is provided with a reflux condenser 26, the vent through which maintains atmospheric pressure in the steam bath and thus provides a constant temperature.

The gas as it passes through the coil 24 is heated to steam temperature and then passes through a conduit 27 into the chamber 28 containing the catalyst and the thermocouples for measuring the evolved heat.

This apparatus is shown in detail in

Figure 2 and comprises an inner cell 29 having openings 30 at top and bottom covered with screens or gratings 31. Side walls 32 within the cell 29 provide a space which contains the thermocouples and the catalyst.

The lower portion of this space is filled with granular pumice stone 33 and the upper portion is filled with a suitable catalyst 34. I prefer to use hopcalite, a specially prepared mixture of manganese dioxide with basic copper carbonate, as the catalyst. This catalyst causes the union of any carbon monoxide present with the oxygen in the air, thus bringing about a temperature increase which is a measure of the amount of CO present. The gases are wasted through the guard tube 42 containing fused calcium chloride to prevent entrance of moisture.

The temperature increase is preferably measured by providing within the catalyst chamber a plurality of thermocouples arranged in series. As shown in Figures 2 to 4 inclusive, these are made up on mica cards 35 surrounded by the pumice stone and hopcalite. The line of division between the pumice stone and hopcalite for best thermoelectric effect is indicated by a heavy chain line in Figures 3 and 4. The cold junctions are at 36 and it will be seen that they lie in the pumice stone while the hot junctions are at 37 surrounded by the hopcalite. The cold junctions 36 will therefore be maintained at the entrance temperature of the gas while the hot junctions will be at a higher temperature determined by the amount of heat evolved when the mixture comes in contact with the catalyst. If desired, the ends of the thermocouple wires at the respective junctions may extend away from the cards to insure better contact by the gases and lead heat to or from the junctions. Lead wires 38 connect the apparatus with any suitable indicating or recording mechanism.

In Figure 1 there is shown a recording instrument 39 adapted to continuously record upon the line chart 40 the amount of CO present in the mixture. There is also shown a bell 41 connected to the recording mechanism 39 and arranged to ring and thus indicate a maximum CO content. It will be understood that if desired the apparatus may be connected to control mechanism for operating fans or dampers to vary the air supply and thus bring conditions back to a desired normal.

The apparatus above described is effective for supplying washed and purified gas at constant temperature to the catalyst and at any desired rate. I have found that there is a best flow rate at which the apparatus should be operated if most accurate results are to be obtained and particularly if it is desired to record the results upon a suitable calibrated chart.

Figure 5 shows the indicated potential plotted against the rate of flow for different gas concentrations. The solid lines show the hydrogen curves, and the chain lines show the CO curves. It will be noted that in each case the curve rises rather sharply up to a maximum and then drops off more slowly. It will also be noted that the peaks of the several hydrogen curves lie substantially in a vertical line indicated at $X^1$ and that the peaks of the CO curves are similarly related, all of them lying in the line $X^2$. I prefer to operate the apparatus at the optimum flow rate thus shown in order to secure the maximum potential for any gas concentration, since this is most conclusive to accurate reading.

It is clear from Figure 5 that if the apparatus is operated at the best flow rate for CO the oxidation of hydrogen will be relatively small. I have found, however, that it is highly desirable to properly regulate the temperature of the gas and the hopcalite when it is desired to make a quantitative determination of a gas containing both CO and $H_2$. By proper temperature regulation the amount of each of the gases present may be very accurately determined.

Figure 6 shows a form of apparatus for the quantitative analysis of CO and $H_2$ mixed with air or oxygen. In using this apparatus the washed and dried gas is supplied through a conduit $23^a$ to a coil $24^a$ and a catalytic cell $28^a$. Both of these are within a container $25^a$, having any desired heating and heat controlling means, indicated at 43.

The container $25^a$ is maintained at substantially 25° C. At this temperature, oxidation of a large portion of the CO occurs, while oxidation of the $H_2$ is negligible. Experiment shows that the percentage of CO oxidized in the cell $28^a$ is substantially constant at any given flow rate so that the temperature increase in the cell is an accurate measure of the CO content. The cell is provided with temperature indicating means (not shown) similar to that illustrated in Figure 1.

The gas leaves the cell $28^a$ through a conduit 44. It passes to a coil $24^b$ and a cell $28^c$ contained in a container $25^b$ and provided with thermostatic temperature controller $43^b$. The cell $28^b$ is preferably maintained at substantially the same temperature as the cell $25^a$. It is not provided with any temperature indicating means, as its function is merely to cause oxidation of any CO remaining in the gas after it passes through the cell $28^a$. It will be understood that while $H_2$ will not be oxidized at a low temperature such as 25° C., the CO will be oxidized at a temperature such as is required to oxidize $H_2$, for example, 100° C. or higher. The cell $28^b$ is therefore valuable in that it removes the CO remaining in the gas and makes for an accurate $H_2$ reading. The cell should be of relatively large size in order to effectively remove the remaining CO.

From the cell 28$^b$ the gas passes through a conduit 45 to a coil 24$^c$ and a cell 28$^c$, both contained in a jacket 25$^c$. The jacket is provided with a thermostatic temperature controlling means 43$^c$ and this is adjusted to maintain a temperature conducive to the oxidation of the $H_2$ content. A temperature of 100° C. or higher is satisfactory and may be easily maintained by a steam bath.

The apparatus in the forms illustrated may be used to determine the amount of CO present in air or oxygen whether $H_2$ is present or not. It may also be used for determining the amount of $H_2$ in air or oxygen, whether CO is present or not, and with the apparatus shown in Figure 6 the amount of each gas present may be determined.

The sensitivity of the apparatus may be regulated as desired by the number of thermocouples employed, and it is preferred to use a large number. By using a suitable number of thermocouples and by operating the apparatus at the best flow rate, as indicated in Figure 5, concentration as low as one part per million may be measured and recorded. An apparatus comprising 48 couples determining CO in an environment of 100° C. has been found to have a best flow rate of 46 liters per minute. Another of 96 couples required 85 liters per minute.

I thus provide a method and apparatus for quantitative determination of gases in which the gases are purified and passed over a catalyst at a constant optimum temperature and constant pressure and at a desired flow rate. The provision of a plurality of thermocouples in series for measuring the evolved heat insures highly accurate readings and this, in combination with the supplying of gas to the apparatus at a rate substantially equivalent to the rate corresponding to maximum temperature increase for any gas concentration, makes it possible to measure exceedingly minute proportions of CO.

The use of hopcalite as a catalyst for carbon monoxide is particularly desirable since hopcalite when used with suitable temperatures and rate of flow is affected only very slightly or not at all by the presence of hydrogen. The apparatus will therefore measure the CO content of a gas and the presence of hydrogen in quantities up to the equivalent volume per cent of the carbon monoxide does not cause appreciable error. The apparatus may be operated at ordinary room temperatures and as far as carbon monoxide is concerned the provision of the steam bath in which the cell is placed is largely a matter of convenience for obtaining a uniform temperature of the gas. In fact, operation at room temperatures enables analysis of small proportions of carbon monoxide in very large proportions of hydrogen. By reducing the rate of flow from the best rate for carbon monoxide and maintaining steam temperatures, the apparatus can be made to record hydrogen when carbon monoxide is absent or has been eliminated. It may thus be very useful in processes for synthetic production of ammonia. As will be seen from Figure 2, the catalyst chamber is exceedingly well insulated so that the potential set up in the lead wires is a true measure of the evolved heat. The apparatus is therefore capable of much more accurate and delicate determinations than have heretofore been considered possible with apparatus of this character. At the same time the advantages of rapid determination are increased largely and none of the advantages of simplicity of apparatus are lost. This is particularly true in view of the provision for purifying the gas, thus preventing poisoning of the catalyst, and the apparatus may be continuously operated for many months at a time without impairing the accuracy of the determinations.

While I have illustrated a preferred embodiment of the invention as particularly applied to the determination of CO or hydrogen content in air, or CO in hydrogen, it will be understood that the invention is not thus limited but may be used to determine acetylene, methane, ethylene, alcohol, formaldehyde or other combustible gases or vapors in air or oxygen, and may be otherwise embodied within the scope of the following claims.

I claim:

1. The method of quantitative determination of gases, which includes subjecting the gas to the action of activated charcoal, passing the gas over a catalyst and measuring the resulting temperature increase.

2. The method of quantitative determination of gases, which includes drying the gas with sulphuric acid, subjecting the gas to the action of activated charcoal, passing the gas over a catalyst and measuring the resulting temperature increase.

3. The method of quantitative determination of gases, which includes subjecting the gas to the action of activated charcoal and a caustic substance, passing the gas over a catalyst and measuring the resulting temperature increase.

4. The method of quantitative determination of carbon monoxide, which includes subjecting the gas to the action of activated charcoal and a caustic substance, drying the gas, passing the gas over a catalyst and measuring the resulting temperature increase.

5. The method of quantitative determination of carbon monoxide, which includes subjecting the gas to the action of activated charcoal and a caustic substance, drying the gas, passing the gas over a catalyst at a predetermined rate, and measuring the increase in temperature or evolved heat.

6. The method of quantitative determination of gases, which includes drying the gas, subjecting the same to the action of activated charcoal, filtering the gas, again subjecting the gas to the action of a drier, passing the gas over a catalyst and measuring the resulting temperature increase.

7. The method of quantitative determination of gases, which includes preliminarily drying the gas, subjecting the gas to the action of activated charcoal and a caustic material, filtering the gas, again subjecting the gas to the action of a drier, passing the gas over a catalyst and measuring the resulting temperature increase.

8. The method of quantitative determination of carbon monoxide, which includes subjecting the gas to the action of a purifier, passing the gas over hopcalite and measuring the temperature increase, the purifier being adapted to remove gases tending to poison the hopcalite.

9. The method of quantitative determination of carbon monoxide, which includes subjecting the gas to the action of a filter, passing the gas over hopcalite and measuring the temperature increase, the filter being adapted to remove suspensoids tending to poison the hopcalite.

10. The method of quantitative determination of carbon monoxide, which includes subjecting the gas to activated charcoal and a caustic substance, drying the gas, passing the gas over hopcalite and measuring the resulting temperature increase.

11. The method of quantitative determination of gases, which includes subjecting the gas to sulphuric acid, subjecting the gas to activated charcoal and a caustic material, filtering the gas, subjecting the gas to fused calcium chloride, passing the gas over hopcalite and measuring the resulting temperature increase.

12. The method of quantitative determination of a plurality of combustible gases in a mixture containing oxygen which includes supplying the mixture to a catalyst at a relatively low temperature to cause oxidation of one of said combustible gases, measuring the resulting temperature increase, thereafter supplying the mixture to a catalyst at a relatively higher temperature to cause oxidation of another of said combustible gases, and measuring the resulting temperature increase.

13. The method of quantitative determination of a plurality of combustible gases in a mixture containing oxygen, which includes subjecting the gas to the action of a purifier at a relatively low temperature to cause oxidation of one of said combustible gases, measuring the resulting temperature increase, thereafter supplying the mixture to a catalyst at a relatively higher temperature to cause oxidation of another of said combustible gases, and measuring the resulting temperature increase, the purifier being adapted to remove gases tending to poison the catalyst.

14. The method of quantitative determination of a plurality of combustible gases in a mixture containing oxygen, drying the mixture, subjecting the mixture to the action of a purifier at a relatively low temperature to cause oxidation of one of said combustible gases, measuring the resulting temperature increase, thereafter supplying the mixture to a catalyst at a relatively higher temperature to cause oxidation of another of said combustible gases, and measuring the resulting temperature increase, the purifier being adapted to remove gases tending to poison the catalyst.

15. The method of quantitative determination of CO and $H_2$ in air or oxygen, which includes supplying the mixture to a catalyst at a relatively low temperature to cause oxidation of the CO, measuring the resulting temperature increase, thereafter subjecting the remainder of the mixture to a catalyst at a relatively higher temperature to cause oxidation of the $H_2$ and measuring the resulting temperature increase.

16. The method of quantitative determination of a plurality of combustible gases in a mixture containing oxygen, which includes supplying the mixture to a catalyst at a relatively low temperature to cause oxidation of at least a portion of one of said combustible gases, thereafter removing from the mixture any of said gas remaining in the mixture, thereafter supplying the remainder of the mixture to a catalyst at a relatively higher temperature to cause oxidation of another of said combustible gases, and measuring the resulting temperature increase.

17. Apparatus for making quantitative determinations of gases, including a catalyst, means for passing gas thereover and a plurality of thermocouples in series each having one junction in the catalyst and the other junction out of the catalyst but in the path of the gas.

18. Apparatus for making quantitative determinations of gases, including a catalyst, means for supplying gas to the catalyst at a substantially constant temperature and a plurality of thermocouples in series each having one junction in the catalyst and the other junction out of the catalyst but in the path of the gases.

19. Apparatus for the quantitative determination of carbon monoxide, including a quantity of hopcalite, means for supplying gas thereto, means for measuring the temperature increase, means for subjecting the gas supplied to the hopcalite to activated charcoal and a caustic substance, and means for drying the gas.

20. Apparatus for the quantitative determination of two or more gases, including a plurality of catalytic bodies adapted to effect a chemical change, means for supplying a gaseous mixture to the catalytic bodies successively, and means for measuring the resulting temperature change at each of said catalysts.

21. Apparatus for the quantitative determination of two or more gases, including a plurality of catalytic bodies adapted to effect a chemical change, means for supplying a gaseous mixture to the catalytic bodies successively, means for maintaining one catalytic body at a different temperature than at another of such bodies, and means for measuring the temperature change at each of said catalysts when the gas is supplied thereto.

22. The method of quantitative determination of two or more gases, which includes supplying a gaseous mixture to a catalytic body adapted to effect a chemical change, then supplying the same gas to another catalytic body adapted to effect a chemical change, and measuring the resulting temperature change at each of said catalysts.

23. The method of quantitative determination of gases, which includes subjecting the gas to the action of a purifier, passing the gas over an oxidizing catalyst, utilizing a sensitive instrument to measure the resulting temperature change, and substantially continuously and automatically recording the readings of said sensitive instrument, the purifier being adapted to remove gases tending to vitiate the analysis.

24. The method of quantitative determination of gases, which includes drying and purifying the gas to remove substances therefrom which would tend to vitiate the analysis, passing the gas over an oxidizing catalyst, utilizing a sensitive instrument to measure the resulting temperature change, and substantially continuously and automatically recording the readings of said sensitive instrument.

25. The method of quantitative determination of gases, which includes purifying the gas to remove therefrom substances which would tend to vitiate the analysis, passing the gas over an oxidizing catalyst, utilizing a sensitive instrument to measure the resulting temperature change, substantially continuously and automatically recording the readings of said sensitive instrument, and actuating a warning signal when a predetermined condition of the gas being analyzed occurs.

26. The method of quantitative determination of gases, which includes mixing the gas to be analyzed with a known proportion of a diluting gas, passing the mixture over a catalyst, the diluting gas being inert with respect to the catalyst, and utilizing a sensitive instrument to measure the resulting temperature change.

27. The method of quantitative determination of carbon monoxide, which includes diluting the gas containing carbon monoxide with air, the air being in known quantity and in such amount as to reduce the carbon monoxide concentration in the mixture to not more than about one-half of one per cent, passing the mixture over hopcalite, and utilizing a sensitive instrument to measure the resulting temperature change.

28. The method of quantitative determination of gases, which includes subjecting the gas to a catalyst to secure a measurable temperature change, and supplying the gas to the catalyst at a rate of flow generally equivalent to the rate of flow at which a peak is secured on a curve in which rate of flow is plotted against temperature change.

29. The method of quantitative determination of gases, which includes subjecting the gas to a catalyst to secure a measurable temperature change, supplying the gas to the catalyst at a rate of flow generally equivalent to the rate of flow at which a peak is secured on a curve in which rate of flow is plotted against temperature change, and utilizing a plurality of thermocouples in series to secure an increased sensitivity in thermoelectric effect for the accurate determination of gas concentration.

30. The method of quantitative determination of gases, which includes subjecting gas to a catalyst to secure a measurable temperature change, supplying the gas to such catalyst at a substantially constant temperature and at a rate of flow generally equivalent to the rate of flow at which a peak is secured on a curve in which a rate of flow is plotted against temperature change.

31. The method of quantitative determination of gases, which includes subjecting the gas to a catalyst at substantially the best rate for the production of a measurable temperature change, that is to say, at substantially the rate at which a maximum temperature increase is occasioned regardless of the gas concentration, and utilizing the temperature change as a measure of the concentration.

32. The method of quantitative determination of gases, which includes purifying the gas, subjecting it to a catalyst at substantially the best rate for the production of a measurable temperature change, that is to say, substantially the rate at which a maximum temperature increase is occasioned regardless of the gas concentration, and utilizing the temperature change as a measure of the concentration, the purifying step being effective for the removal of substances tending to vitiate the analyses.

33. The method of quantitative determination of two or more gases, which includes supplying the gases to a catalytic body adapted to effect a chemical change and maintaining the catalytic body at a desired temperature, applying the same gas after it leaves the first catalytic body to a second catalytic body, maintaining the second catalytic body at a different temperature, and measuring the resulting temperature change at each of said catalysts.

34. Apparatus for quantitative determination of gases, including a gas washer, a trap for reducing the possibility of liquid being carried over from the gas washer, a constant flow device for regulating the flow of gas through the apparatus, a secondary drier adapted to remove moisture entrained in the passage of gas through the apparatus, and a catalytic cell having electrical means for measuring the temperature change in the catalytic cell.

35. Apparatus for the quantitative determination of gases, including purifying means, a catalytic cell containing an oxidizing catalyst, the purifying means being adapted to remove substances tending to vitiate the analysis, electrical means for measuring the temperature change in the catalytic cell, a discharge conduit leading from catalytic cell, and means for preventing the entrance of deleterious gases or vapors through the discharge conduit to the catalytic cell.

36. Apparatus for the quantitative determination of gases, including gas supply means, a caustic material, activated charcoal and a filter in the path of the gas, a drier, a catalytic cell containing a catalyst, and a thermocouple in said cell for determining the temperature increase in the cell.

37. Apparatus for the quantitative determination of gases, including gas supply means, a drier, a purifier, a constant temperature chamber containing preheating means for bringing the gas being analyzed up to substantially the temperature of the chamber, a catalytic cell within the chamber having a catalyst therein, and a thermocouple within the cell for determining the temperature increase in the cell.

38. Apparatus for the quantitative determination of gases, including gas supply means, a drier, a purifier, a constant temperature chamber containing preheating means for bringing the gas being analyzed up to substantially the temperature of the chamber, a catalytic cell within the chamber having a catalyst therein, and electrical temperature measuring means for measuring the evolved heat.

39. Apparatus for the quantitative determination of gases, including gas supply means, a gas washer, a trap adapted to reduce the tendency of liquid to pass over from the gas washer, a caustic material, a filter and a quantity of activated charcoal in the path of the gas, a constant flow device for regulating the rate at which gas passes through the apparatus and a flow meter for measuring the same, a drier adapted to remove moisture entrained in the passage of the gas through the apparatus, a constant temperature chamber, a heating coil therein adapted for bringing the gas to substantially the chamber temperature, a catalytic cell within the chamber, and electrical temperature measuring and recording means operatively connected with the catalytic cell.

40. Apparatus for the quantitative determination of gases, including gas supply means, a gas washer, a trap adapted to reduce the tendency of liquid to pass over from the gas washer, a caustic material, a filter and a quantity of activated charcoal in the path of the gas, a drier adapted to remove moisture entrained in the passage of the gas through the apparatus, a constant temperature chamber, a heating coil therein adapted for bringing the gas to substantially the chamber temperature, a catalytic cell within the chamber, and electrical temperature measuring and recording means operatively connected with the catalytic cell.

In testimony whereof I have hereunto set my hand.

SIDNEY H. KATZ.